Patented July 28, 1936

2,049,007

UNITED STATES PATENT OFFICE 2,049,007

WATER-INSOLUBLE AZO-DYESTUFFS AND FIBER DYED THEREWITH

Oskar Haller, Offenbach-on-the-Main, and Heinrich Morschel, Cologne-Deutz, Germany, assignors to General Aniline Works, Inc., New York, N. Y., a corporation of Delaware No Drawing. Application March 11, 1935, Serial No. 10,583. In Germany March 14, 1934

12 Claims. (Cl. 260—97)

The present invention relates to water-insoluble azo-dyestuffs and to fiber dyed therewith; more particularly it relates to dyestuffs of the following general formula:

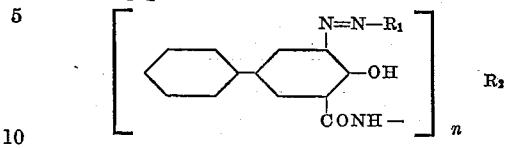

wherein $n$ means the number 1 or 2, $R_1$ stands for a radical of the benzene, naphthalene, diphenyl or anthraquinone series and $R_2$ stands for a radical of the benzene, naphthalene, diphenyl or carbazole series.

According to U. S. patent application Serial No. 10,582, filed March 11, 1935 by Oskar Haller and Heinrich Morschel for "Arylides of 4-hydroxy-diphenyl-3-carboxylic acid", which application has matured into U. S. Patent No. 2,025,587, there may be obtained from 4-hydroxydiphenyl-3-carboxylic acid by condensation with arylamines according to known methods the 4-hydroxydiphenyl-3-carboxylic acid arylides.

Now, we have found that valuable azo-dyestuffs may be obtained by coupling the above mentioned 4-hydroxydiphenyl-3-carboxylic acid arylides with diazo-, tetrazo- or diazo-azo-compounds, only such components being used, as do not contain groups lending solubility, such as the sulfonic acid or carboxylic acid group. There are in most cases obtained brown and olive-green tints of good properties of fastness. The new dyestuffs may be used for preparing pigment colors but preferably for dyeing fibers by the ice-color method or for printing fibers by one of the known printing processes.

The following examples serve to illustrate the invention but they are not intended to limit it thereto:

(1) Cotton piece goods are impregnated on a foulard with a solution containing per liter 20 grams of 4-hydroxydiphenyl - 3 - carbonyl-aminobenzene
20 cc. of Turkey red oil and
40 cc. of caustic soda solution of 34° Bé.

and, after intermediate drying, developed in a solution containing per liter the diazo compound from 15.3 grams of 1-amino-2-(4'-chlorophenoxy)-5-chlorobenzene. The material is rinsed, soaped and dried. A green-olive dyeing of very good fastness to light is obtained. The dyestuff has the following formula:

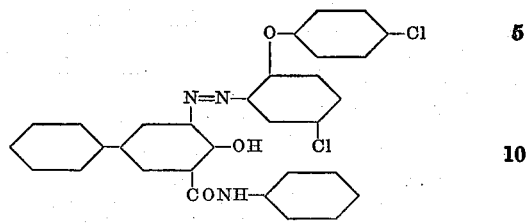

By using the diazo compound from 1-amino-2-phenoxy-5-chlorobenzene and 4-hydroxydiphenyl-3-carbonyl-(1' - amino - 4' - chlorobenzene) a green olive, and with 4-hydroxydiphenyl-3-carbonyl-(1'-amino - 2' - methoxybenzene) a brown-olive dyeing of likewise very good fastness to light are obtained.

(2) Well pre-treated cotton yarn is impregnated with a solution containing per liter 5 grams of bis-(4-hydroxydiphenyl - 3 - carbonyl)-4',4''-diamino-3',3''-dimethoxydiphenyl
10 cc. of Turkey red oil
15 cc. of caustic soda solution of 34° Bé., and
20 grams of sodium chloride.

It is then thoroughly wrung out and developed in a diazo-solution neutralized with an alkali metal bicarbonate and containing per liter the diazo compound from 1.62 grams of 1-amino-2,5-dichlorobenzene. The material is rinsed and soaped at boiling temperature. A yellowish-brown dyeing of very good fastness to washing is thus obtained.

The dyestuff has the following formula:

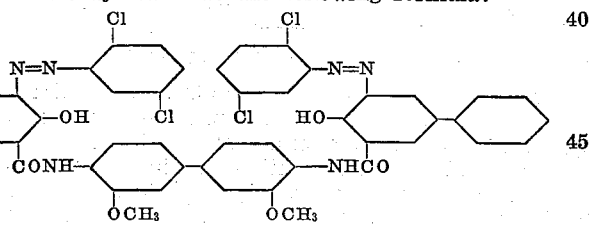

1-amino-2,5-dichlorobenzene that from 1-amino-

By using instead of the diazo compound from 2-(2',5'-dichlorophenoxy)-5-chlorobenzene there is likewise obtained a yellowish-brown dyeing of good fastness properties.

The process may be conducted in the same manner with other arylides of 4-hydroxydiphenyl-3-carboxylic acid and other diazo-, tetrazo- or diazo-azo-compounds.

The following table indicates a number of other azo-dyestuffs obtainable according to the present invention:

| | 4-hydroxydiphenyl-3-carbonyl- | Coupled with diazo or tetrazo compounds of: | Tints |
|---|---|---|---|
| 1 | Aminobenzene | 1-amino-2,5-dichlorobenzene | Yellowish brown. |
| 2 | Aminobenzene | 4-amino-3,2'-dimethyl-1,1'-azobenzene | Orange-brown. |
| 3 | Aminobenzene | 4-amino-4'-methoxy-diphenylamine | Brown. |
| 4 | Aminobenzene (2 mols) | 4,4'-diamino-3,3'-dichloro-diphenyl | Reddish brown. |
| 5 | Aminobenzene (2 mols) | 4,4'-diamino-3,3'-dimethoxy-diphenyl | Dark brown. |
| 6 | Aminobenzene | 1-amino-2-phenoxy-5-chlorobenzene | Green-olive. |
| 7 | Aminobenzene | 1-amino-4-benzoylamino-2,5-dichlorobenzene | Brown-yellow. |
| 8 | 1'-amino-2'-methoxy-benzene | 1-amino-2-(4'-chlorophenoxy)-5-chlorobenzene | Olive-brown. |
| 9 | 1'-amino-2'-methoxy-benzene | 1-amino-2-(2',5'-dichlorophenoxy)-5-chlorobenzene | Grey-brown. |
| 10 | 1'-amino-2'-methoxy-benzene | 1-amino-4-(2',5'-dichlorophenoxy)-3-chlorobenzene | Brownish old gold. |
| 11 | 1'-amino-2'-methoxy-benzene | 1-amino-4-benzoylamino-2,5-dichlorobenzene | Yellowish-brown |
| 12 | 1'-amino-4'-chloro-benzene | 4-amino-3,2-dimethyl-1,1'-azobenzene | Olive. |
| 13 | 1'-amino-4'-chlorobenzene | 1-amino-2-(4'-chlorophenoxy)-5-chlorobenzene | Green-olive. |
| 14 | 1'-amino-2,4'-chloro-benzene | 1-amino-2,4,5-trichlorobenzene | Brown. |
| 15 | 1'-amino-4'-chlorobenzene | 1-amino-4-nitronaphthalene | Reddish brown. |
| 16 | 2'-amino-naphthalene (2 mols) | 4,4'-diamino-3,3'-dichloro-diphenyl | Brown. |
| 17 | 2'-amino-naphthalene | 1-amino-2-phenoxy-5-chloro-benzene | Green-olive. |
| 18 | 1'-amino-naphthalene | 1-amino-2,5-dichloro-benzene | Olive-brown. |
| 19 | 1'-amino-naphthalene | 1-amino-2-methyl-4-nitro-benzene | Black. |
| 20 | 1'-amino-2',5'-dimethoxy-benzene | 4-amino-3,2'-dimethyl-1,1'-azo-benzene | Yellowish brown. |
| 21 | 1'-amino-2',4'-dimethyl-benzene | 1-amino-4-benzoylamino-3-methoxy-6-chloro-benzene | Yellow-brown. |
| 22 | 1'-amino-2',4'-dimethyl-benzene | 1-amino-2,5-dichloro-benzene | Brown. |
| 23 | 1'-amino-2',4'-dimethyl-benzene | 1-amino-2-phenoxy-5-chloro-benzene | Dark brown-olive. |
| 24 | 1'-amino-2',4'-dimethyl-benzene | 1-amino-4-nitro-naphthalene | Brown. |
| 25 | 1'-amino-4'-methyl-benzene | 1-amino-2,5-dichloro-benzene | Brown. |
| 26 | 1'-amino-4'-methyl-benzene | 1-amino-2-phenoxy-5-chloro-benzene | Dark olive. |
| 27 | 1'-amino-3'-methyl-benzene | 1-amino-2,5-dichloro-benzene | Brown. |
| 28 | 1'-amino-3'-methyl-benzene | 1-amino-2-phenoxy-5-chloro-benzene | Dark olive. |
| 29 | 1'-amino-3'-nitro-benzene | 1-amino-2-phenoxy-5-chloro-benzene | Green-olive. |
| 30 | 1'-amino-3'-nitro-benzene | 1-amino-2-(2',5'-dichloro-phenoxy)-5-chloro-benzene | Green-olive. |

| | bis-(4-hydroxy-diphenyl-3-carbonyl)- | Coupled with 2 mols of the diazo compound of: | Tints |
|---|---|---|---|
| 31 | 4',4''-diamino-3',3''-dimethoxy-diphenyl | 1-amino-2-phenoxy-5-chloro-benzene | Brown. |
| 32 | 4',4''-diamino-3',3''-dimethoxy-diphenyl | 1-amino-2-chloro-4-nitro-benzene | Dark brown. |
| 33 | 4',4''-diamino-3',3''-dimethoxy-diphenyl | 1-amino-4-methyl-2-nitro-benzene | Dark brown. |
| 34 | 4',4''-diamino-3',3''-dimethoxy-diphenyl | 1-amino-2-methoxy-4-nitro-benzene | Dark olive. |
| 35 | 4',4''-diamino-3',3''-dimethoxy-diphenyl | 1-amino-2-(2',5'-dichloro-phenoxy)-5-chloro-benzene | Yellowish brown. |
| 36 | 4',4''-diamino-3',3''-dimethoxy-diphenyl | 1-amino-4-benzoylamino-2,5-dichloro-benzene | Yellowish brown. |
| 37 | 4',4''-diamino-3',3''-dimethoxy-diphenyl | 1-amino-3-methyl-2,4-dichloro-benzene | Yellowish brown. |
| 38 | 1',4'-diamino-benzene | 1-amino-2-phenoxy-5-chloro-benzene | Olive-brown. |
| 39 | 1',4'-diamino-benzene | 1-amino-2-phenylsulfonyl-benzene | Red-brown. |
| 40 | 1',4'-diamino-benzene | 1-amino-2-chloro-5-trifluoromethylbenzene | Yellowish brown. |
| 41 | 4',4'-diamino-stilbene | 1-amino-anthraquinone | Grey-brown. |
| 42 | 1',5'-diamino-naphthalene | 4-amino-2,5-dimethoxy-4'-nitro-azo-benzene | Dark brown. |
| 43 | 3',6'-diamino-carbazole | 1-amino-4-benzoylamino-2,5-diethoxybenzene | Reddish grey-brown. |
| 44 | 3',6'-diamino-carbazole | 1-amino-2-methyl-5-chloro-benzene | Brown. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble azo-dyestuffs of the following general formula:

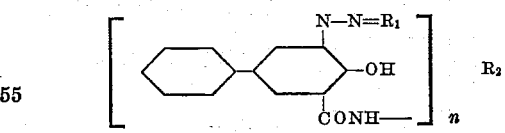

wherein $n$ means the number 1 or 2, $R_1$ stands for a radical of the benzene, naphthalene, diphenyl or anthraquinone series and $R_2$ stands for a radical of the benzene, naphthalene, diphenyl or carbazole series, yielding, when produced on the fiber, in general brown and olive-green dyeings of good fastness properties.

2. The water-insoluble azo-dyestuffs of the following general formula:

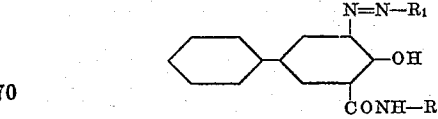

wherein $R_1$ stands for a radical of the benzene, naphthalene, diphenyl or anthraquinone series and $R_2$ stands for a radical of the benzene series,
yielding, when produced on the fiber, in general brown and olive-green dyeings of good fastness properties.

3. The water-insoluble azo-dyestuffs of the following general formula:

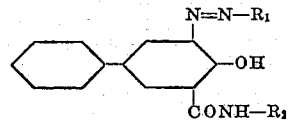

wherein $R_1$ and $R_2$ stand for radicals of the benzene series, yielding, when produced on the fiber, in general brown and olive-green dyeings of good fastness properties.

4. The water-insoluble azo-dyestuff of the following formula:

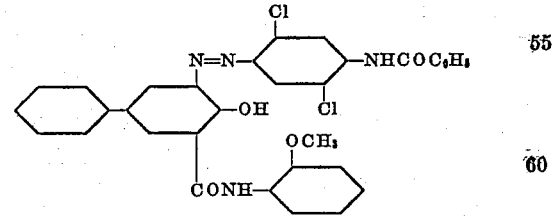

yielding, when produced on the fiber, yellow-brown dyeings of good fastness properties.

5. The water-insoluble azo-dyestuff of the following formula:

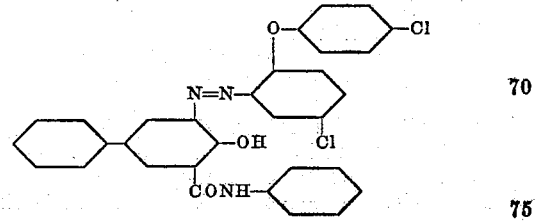

yielding, when produced on the fiber, dark olive dyeings of good fastness properties.

6. The water-insoluble azo-dyestuff of the following formula:

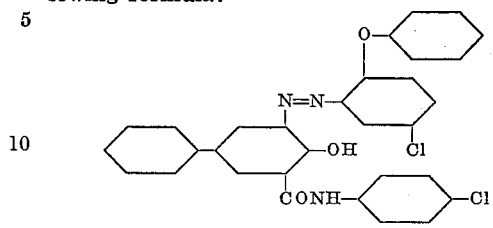

yielding, when produced on the fiber, dark olive dyeings of good fastness properties.

7. Fiber dyed with the azo-dyestuffs as claimed in claim 1.
8. Fiber dyed with the azo-dyestuffs as claimed in claim 2.
9. Fiber dyed with the azo-dyestuffs as claimed in claim 3.
10. Fiber dyed with the azo-dyestuff as claimed in claim 4.
11. Fiber dyed with the azo-dyestuff as claimed in claim 5.
12. Fiber dyed with the azo-dyestuff as claimed in claim 6.

OSKAR HALLER.
HEINRICH MORSCHEL.